(12) United States Patent
He et al.

(10) Patent No.: US 11,852,915 B2
(45) Date of Patent: Dec. 26, 2023

(54) POLARIZER, MANUFACTURING METHOD THEREOF, AND DISPLAY DEVICE

(71) Applicant: WUHAN CHINA STAR OPTOELECTRONICS TECHNOLOGY CO., LTD., Wuhan (CN)

(72) Inventors: Rui He, Wuhan (CN); Wei Cheng, Wuhan (CN)

( * ) Notice: Subject to any disclaimer, the term of this patent is extended or adjusted under 35 U.S.C. 154(b) by 289 days.

(21) Appl. No.: 17/283,279

(22) PCT Filed: Mar. 31, 2021

(86) PCT No.: PCT/CN2021/084662
§ 371 (c)(1),
(2) Date: Apr. 7, 2021

(87) PCT Pub. No.: WO2022/188223
PCT Pub. Date: Sep. 15, 2022

(65) Prior Publication Data
US 2023/0105299 A1    Apr. 6, 2023

(30) Foreign Application Priority Data
Mar. 12, 2021 (CN) .......................... 202110268591.0

(51) Int. Cl.
*G02F 1/1335* (2006.01)
*G02B 5/30* (2006.01)
*G02F 1/1337* (2006.01)

(52) U.S. Cl.
CPC ..... *G02F 1/133531* (2021.01); *G02B 5/3016* (2013.01); *G02F 1/133514* (2013.01); *G02F 1/133723* (2013.01)

(58) Field of Classification Search
CPC ......... G02F 1/133531; G02F 1/133514; G02F 1/133723; G02B 5/3016
USPC ...................................................... 349/96–98
See application file for complete search history.

(56) References Cited

U.S. PATENT DOCUMENTS

| | | | | |
|---|---|---|---|---|
| 2004/0027510 | A1* | 2/2004 | Iijima | G02F 1/133528 349/61 |
| 2010/0259708 | A1 | 10/2010 | Hiratsuka et al. | |
| 2010/0289984 | A1* | 11/2010 | Kishioka | G02F 1/133526 349/96 |
| 2013/0342797 | A1* | 12/2013 | Chiou | G02B 5/3083 349/123 |

(Continued)

FOREIGN PATENT DOCUMENTS

| | | |
|---|---|---|
| CN | 101311777 A | 11/2008 |
| CN | 102565908 A | 7/2012 |
| CN | 104950525 A | 9/2015 |

(Continued)

*Primary Examiner* — Charles S Chang (57) ABSTRACT

The present application discloses a polarizer, a manufacturing method thereof, and a display device. The polarizer includes an alignment layer and a polarizer main body disposed on a side surface of the alignment layer. The polarizer main body includes a plurality of light-transmitting regions distributed on the polarizer main body at intervals and a non-light-transmitting region surrounding the light-transmitting regions. The alignment layer includes alignment regions corresponding to the light-transmitting regions and a non-alignment region corresponding to the non-light-transmitting region.

8 Claims, 6 Drawing Sheets

(56) References Cited

U.S. PATENT DOCUMENTS

2014/0118656 A1  5/2014  Jang et al.

FOREIGN PATENT DOCUMENTS

| CN | 105068296 A | 11/2015 |
| CN | 106019455 A | 10/2016 |
| CN | 107976838 A | 5/2018 |
| CN | 108663851 A | 10/2018 |
| CN | 112363347 A | 2/2021 |
| JP | 2014106249 A | 6/2014 |

* cited by examiner

POLARIZER, MANUFACTURING METHOD THEREOF, AND DISPLAY DEVICE

FIELD OF INVENTION

The present application is related to the field of polarizer technology and, specifically, to a polarizer, a manufacturing method thereof, and a display device.

BACKGROUND OF INVENTION

Nowadays, with development of display technology, people's demand for display is gradually increasing, display technology is also changing day by day, and display forms are also diversified. Polarizers are indispensable and important film materials in liquid crystal displays. However, traditional polyvinyl alcohol (PVA) iodine-based polarizers cannot be designed in-cell or be patterned due to their thick films and poor flexibility, so requirements cannot be satisfied in this type of new display technology. Coatable polarizers have attracted much attention because of their ultra-thin films, good flexibility, printability, coatability, in-cell capability, and patternability.

SUMMARY OF INVENTION

In order to solve the above technical problems, the present application provides a polarizer, a manufacturing method thereof, and a display device to solve a technical problem of increasing a thickness of a display device due to a need to increase a black matrix in the prior art to improve light leakage and light mixing problems of a display panel.

Technical solutions for solving the above technical problems are as follows. The present application provides a polarizer including an alignment layer and a polarizer main body disposed on a side surface of the alignment layer. The polarizer main body includes a plurality of light-transmitting regions distributed on the polarizer main body at intervals and a non-light-transmitting region surrounding the light-transmitting regions. The alignment layer includes alignment regions corresponding to the light-transmitting regions.

Furthermore, the polarizer main body is a composite layer including a dichroic dye and a liquid crystal mixture.

Furthermore, the polarizer further includes a substrate. The alignment layer is disposed on a side surface of the substrate, and the polarizer main body is disposed on the side surface of the alignment layer away from the substrate.

Furthermore, the side surface of the substrate is defined with at least one groove. The groove surrounds and forms a plurality of protrusions. The groove corresponds to the non-light-transmitting region. A thickness of the polarizer main body corresponding to the protrusions is less than a thickness of the polarizer main body corresponding to the groove.

Furthermore, the alignment layer is only disposed on surfaces of the protrusions.

The present application further provides a manufacturing method of a polarizer including steps of: providing a substrate; forming an alignment layer on the substrate and forming alignment regions distributed in an array on the alignment layer; and forming a polarizer main body on the alignment layer, forming light-transmitting regions on the polarizer main body corresponding to the alignment regions, and forming a non-light-transmitting region on a rest of the polarizer main body.

Furthermore, material of the polarizer main body includes a dichroic dye and a liquid crystal mixture, and the polarizer main body is manufactured by coating.

The present application further provides a display device including: a backlight module including a light-emitting side; a first polarizer disposed on the light-emitting side of the backlight module; an array substrate disposed on a side surface of the first polarizer away from the backlight module; a liquid crystal layer disposed on a side surface of the array substrate away from the first polarizer; a color filter substrate disposed on a side surface of the liquid crystal layer away from the array substrate; and a second polarizer disposed on a side surface of the color filter substrate away from the liquid crystal layer. The first polarizer and/or the second polarizer is the above-mentioned polarizer.

Furthermore, the color filter substrate includes a plurality of color resist units. Each of the color resist units corresponds to one of the light-transmitting regions.

Furthermore, a gap is provided between two adjacent color resist units, and the gap corresponds to the non-light-transmitting region; or an overlapping region is provided between two adjacent color resist units, and the overlapping region corresponds to the non-light-transmitting region.

Beneficial effects of the present application are as follows. The polarizer, the manufacturing method thereof, and the display device in the present application divide the polarizer in a direction of a light-emitting side of the backlight module into the light-transmitting region and the non-light-transmitting region. The light-transmitting region corresponds to a display region and can normally transmit light. The non-light-transmitting region corresponds to a non-display region and serves to shield light, which has a similar effect as an effect of a black matrix in a color filter and can even completely replace the black matrix. Therefore, the black matrix can be thinned or even eliminated, and normal display of the display panel can be ensured. Moreover, the polarizers are coated polarizers, which can be made by coating, thereby simplifying manufacturing processes and reducing costs.

DESCRIPTION OF DRAWINGS

The following describes specific embodiments of the present application in detail with reference to the accompanying drawings, which will make technical solutions and other beneficial effects of the present application obvious.

REFERENCE SIGNS backlight module 100, liquid crystal panel 200, backplate 110, reflective plate 120, light guide plate 130, backlight source 140, heat sink 150, bottom plate 102, side plate 104, first polarizer 210, array substrate 220, liquid crystal layer 230, color filter substrate 240, second polarizer 250, substrate 211, alignment layer 212, polarizer main body 213, alignment region 2121, non-alignment region 2122, light-transmitting region 2131, non-light-transmitting region 2132, color resist unit 241, gap 2411, overlapping region 2412, third polarizer 251, dichroic dye molecules 21301, and liquid crystal molecules 21302.

DETAILED DESCRIPTION OF PREFERRED EMBODIMENTS

The technical solution of the present application embodiment will be clarified and completely described with reference accompanying drawings in embodiments of the present application embodiment. Obviously, the present application described parts of embodiments instead of all of the embodiments. Based on the embodiments of the present application, other embodiments which can be obtained by a skilled in the art without creative efforts fall into the protected scope of the of the present application.

The following application provides many different embodiments or examples for implementing different structures of the present application. To simplify the application of the present application, the components and settings of specific examples are described below. Obviously, these are merely examples instead of limitation of the present application. Furthermore, the present application may repeat reference numbers and/or reference letters in different examples, and such repetition is for the purpose of simplicity and clarity, and does not indicate the relationship between the various embodiments and/or settings. Moreover, the present application provides examples of various specific processes and materials, but the applicability of other processes and/or application of other materials may be appreciated by a person skilled in the art.

First Embodiment

Figure 2:
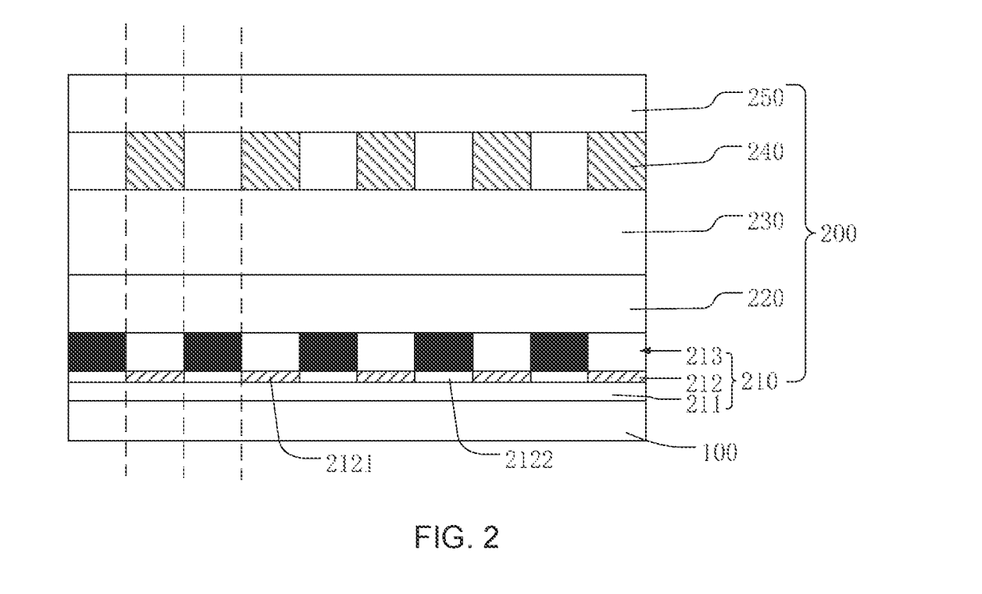
FIG. 2 is a structural schematic diagram of a display device in the first embodiment.

Please refer to FIG. 2. An embodiment of the present application provides a display device including a backlight module 100 and a liquid crystal panel 200.

The backlight module 100 is an edge-type backlight module. Please refer to FIG. 1. The edge-type backlight module includes a backplate 110, a reflective plate 120 disposed in the backplate 110, a light guide plate 130 disposed on the reflective plate 120, a backlight source 140 disposed in the backplate 110, and a heat sink 150 disposed between the backlight source 140 and the backplate 110. The backplate 110 includes a bottom plate 102 and a side plate 104 connected to the bottom plate 102. The backlight source 140 is mounted on the heat sink 150 through a heat-dissipating adhesive (not shown). The heat sink 150 is generally an aluminum plate, a copper plate, or a graphite patch, which is fixed to the bottom plate 102 of the backplate 110 by screws. Heat emitted by the backlight source 140 is transferred to the bottom plate 102 of the backplate 110 through the heat sink 150 and engages in heat exchange with external air through the backplate 110 to dissipate heat.

Figure 1:
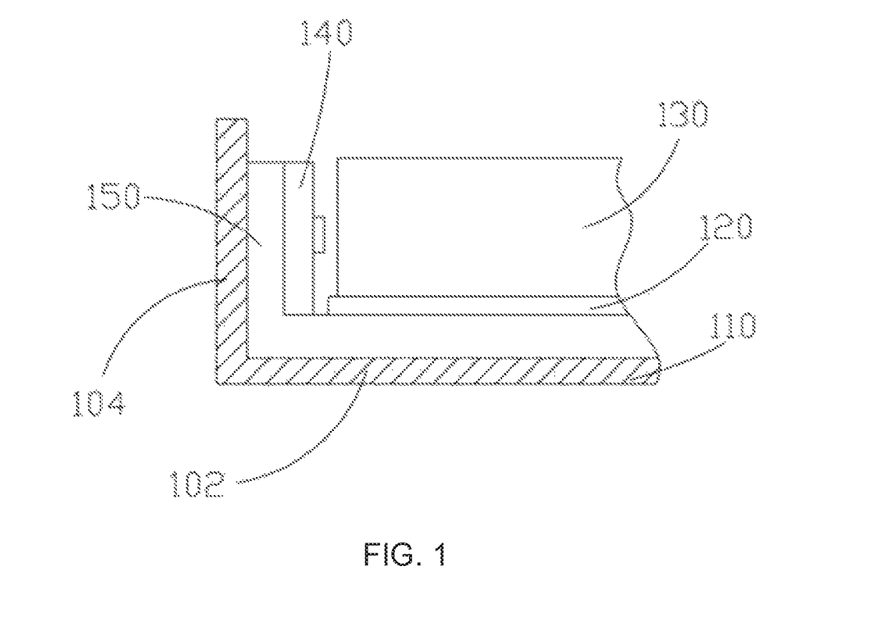
FIG. 1 is a structural schematic diagram of a backlight module in a first embodiment.

The edge-type backlight module can be provided with a backlight source light-emitting diode (LED) light bar on an edge of the backplate behind the liquid crystal panel. Light emitted by the LED light bar enters the light guide plate (LGP) from a light incident surface on a side of the light guide plate, is reflected and diffused, and then emitted from a light-emitting surface of the light guide plate, and passes through an optical film set to form a surface light source for the liquid crystal panel.

Please refer to FIG. 2. The liquid crystal panel 200 includes a first polarizer 210, an array substrate 220, a liquid crystal layer 230, a color filter substrate 240, and a second polarizer 250.

The first polarizer 210 is disposed on a light-emitting side of the backlight module 100. The light-emitting side of the backlight module 100 emits a stable surface light source. After the surface light source passes through the first polarizer 210, it is filtered by the first polarizer 210 into a plurality of parallel light beams. A direction of the parallel light beams is axially parallel to a light-transmitting axis of the first polarizer 210.

Specifically, the first polarizer 210 includes a substrate 211, an alignment layer 212, and a polarizer main body 213.

The substrate 211 is a fully transparent substrate. In this embodiment, the substrate 211 is a transparent glass substrate. The substrate 211 is configured to receive the alignment layer 212 and the polarizer body 213. The alignment layer 212 is disposed on a side surface of the substrate 211. The polarizer main body 213 is disposed on a side surface of the alignment layer 212 away from the substrate 211. The first polarizer 210 is provided with a first polarization direction, so that after liquid crystals are deflected with a same deflection direction as the first polarization direction, light can be emitted through the first polarizer 210.

Material of the alignment layer 212 is polyimide (PI). An alignment process of a PI solution is as follows. A layer of the PI solution is printed on the substrate 211. The substrate 211 printed with the PI solution is placed on a carrier, wherein a side of the substrate 211 printed with the PI solution is away from the carrier. The substrate 211 printed with the PI solution forms a certain deflection angle with respect to a fixed light box. The light box emits ultraviolet (UV) light with a fixed wavelength, which irradiates the substrate 211 to cause the PI solution to react. The carrier and the substrate 211 printed with the PI solution pass through the light box in a straight-line direction to complete an optical alignment process.

In another preferred embodiment of the present application, the alignment layer 212 can also be aligned by embossing or printing.

In another preferred embodiment of the present application, it is also possible to divide an alignment region and a non-alignment region on the substrate 211 in advance, and only apply the PI solution or other alignment solutions on the alignment region. In this way, the PI solution only needs to be patterned in the alignment region to enable the alignment layer 212 in the alignment region to have an alignment force. Because the substrate 211 corresponding to the non-alignment region does not need the alignment force, the non-alignment region does not need to be coated with the PI solution, thereby saving the PI solution and preventing waste of resources.

Figure 3:
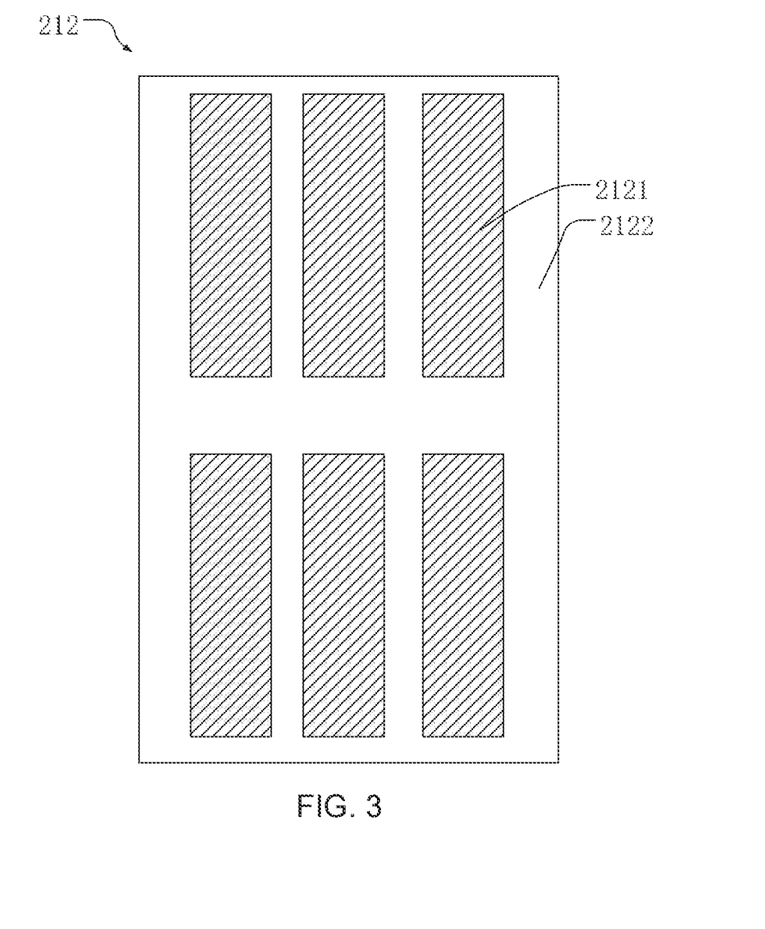
FIG. 3 is a plan view of an alignment layer in the first embodiment.

Please refer to FIG. 3. In this embodiment, the alignment layer 212 includes an alignment region 2121 and a non-alignment region 2122. The alignment region 2121 is distributed in an array. The non-alignment region 2122 is disposed between two adjacent alignment regions 2121 and around the alignment region 2121. The alignment layer 212 has the alignment force at the alignment region 2121, and the alignment layer 212 does not have the alignment force at the non-alignment region 2122.

Figure 4:
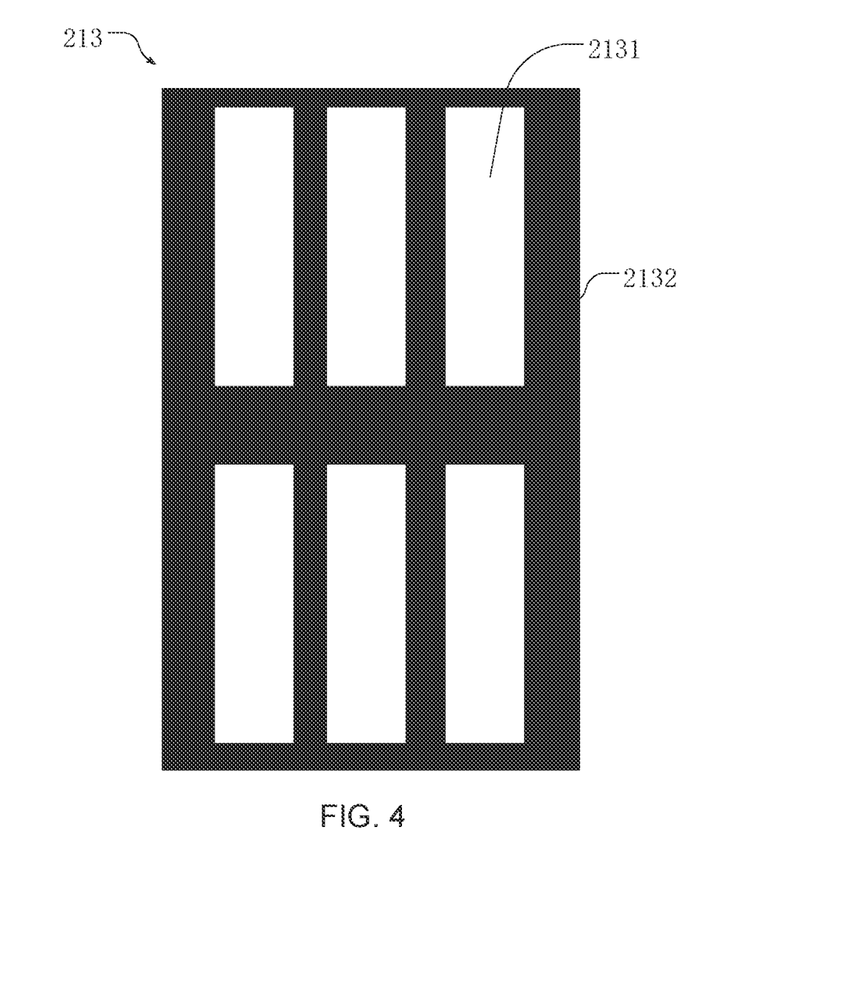
FIG. 4 is a plan view of a polarizer main body in the first embodiment.

Because the alignment layer 212 has the alignment force at the alignment region 2121, and the alignment layer 212 does not have the alignment force at the non-alignment region 2122, referring to FIG. 4, a light-transmitting region 2131 corresponds to the alignment region 2121 of the alignment layer 212, and a non-light-transmitting region 2132 corresponds to the non-alignment region 2122 of the alignment layer 212.

The light-transmitting region 2131 has a plurality of parallel light-transmitting axes, and the light-transmitting axes can allow light parallel to an axial direction of the light-transmitting axes to pass through, thereby realizing a polarization function of the polarizer.

Because the non-light-transmitting region 2132 does not have the alignment force, any light is not allowed to pass. Therefore, the non-light-transmitting region 2132 is a light-shielding region, which can block direct light from the non-light-transmitting region 2132 in any direction.

Figure 5:
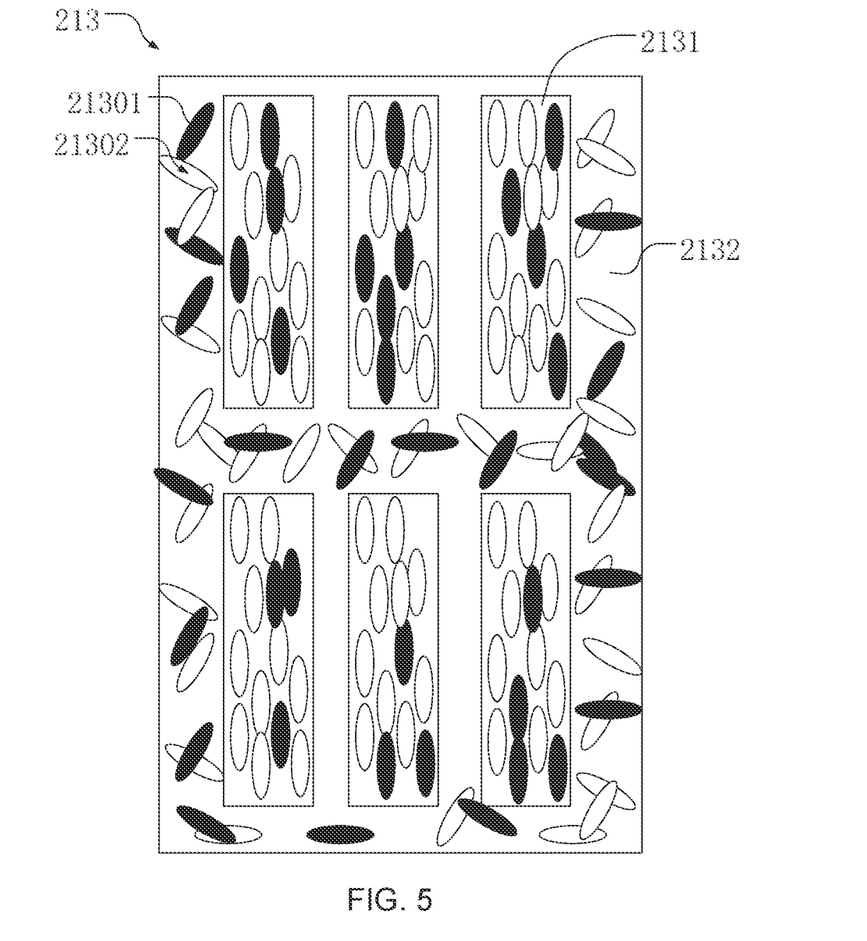
FIG. 5 illustrates deflections of the polarizer main body in the first embodiment.

Please refer to FIG. 5. Specifically, the polarizer main body 213 is a composite layer including a dichroic dye and a liquid crystal mixture. The dichroic dye can have different light absorption along different axes. In this embodiment, in the light-transmitting region 2131, under an action of the alignment force of the alignment region 2121 of the alignment layer 212, liquid crystal molecules 21302 in the composite layer can make dispersed dichroic dye molecules 21301 parallel to their major axes, so that the liquid crystal molecules 21302 and the dichroic dye molecules 21301 are directionally distributed. In addition, a deflection direction of the liquid crystal molecules 21302 and the dichroic dye molecules 21301 is parallel to a light-transmitting axis of the light-transmitting region 2131, so that light corresponding to the light-transmitting region 2131 is allowed to pass through.

On the contrary, in the non-alignment region 2122 of the alignment layer 212, because there is no alignment force in the non-alignment region 2122, the dichroic dye molecules 21301 and the liquid crystal molecules 21302 in the composite layer in the non-light-transmitting region 2132 are in no need to be distributed. The dichroic dye molecules 21301 in the non-light-transmitting region 2132 absorb visible light isotropically, so that all light entering the non-light-transmitting region 2132 cannot pass through the non-light-transmitting region 2132, thereby achieving a technical effect of light shielding.

In this embodiment, the polarizer main body 213 is the composite layer, and light transmission and light shielding of the first polarizer 210 is achieved by deflection or non-deflection of the dichroic dye and the liquid crystal mixture in the composite layer.

Figure 6:
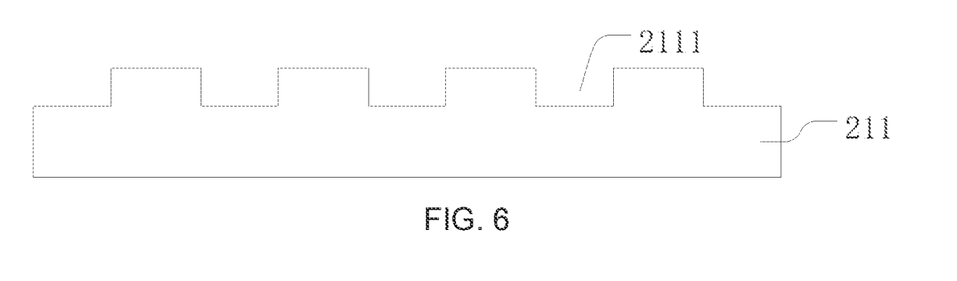
FIG. 6 is a structural schematic diagram of a substrate in a preferred embodiment.

As shown in FIG. 6, in another preferred embodiment of the present application, a groove 2111 is defined on one side surface of the substrate 211. The groove 2111 is recessed on the one side surface of the substrate 211, and the groove 2111 corresponds to the non-alignment region 2122. A recess depth of the groove 2111 is 1 micron to 50 microns. In other words, the substrate 211 has a plurality of protrusions corresponding to the alignment region 2121. Because the alignment layer 212 is only configured for alignment, and the alignment layer 212 can be formed with only a thin layer of the PI solution, a thickness of the alignment layer 212 at any position on the substrate 211 remains constant.

Figure 8:
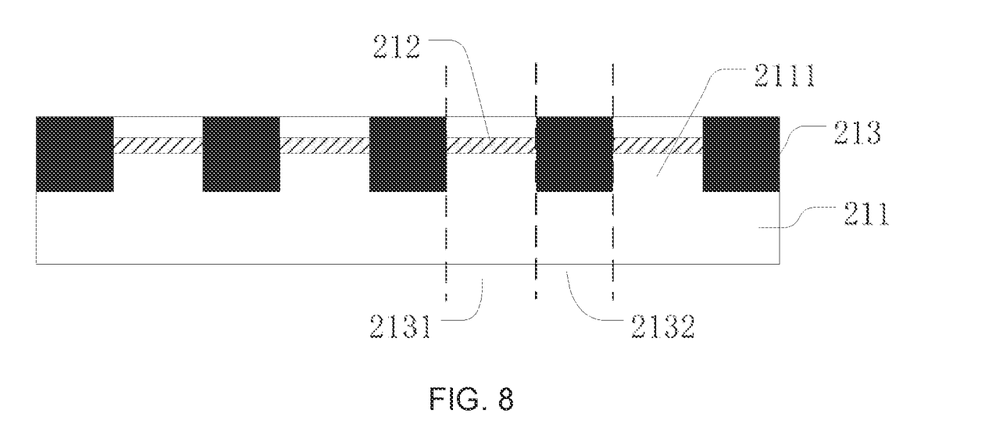
FIG. 8 is a structural schematic diagram of a polarizer in another preferred embodiment.

As shown in FIG. 8, in a preferred embodiment of the present application, only surfaces of the protrusions are provided with the alignment layer 212; that is, the alignment layer 212 is not provided on the groove 2111. This saves material of the alignment layer 212 and also increases a height difference between the groove 2111 and the protrusions.

Figure 7:
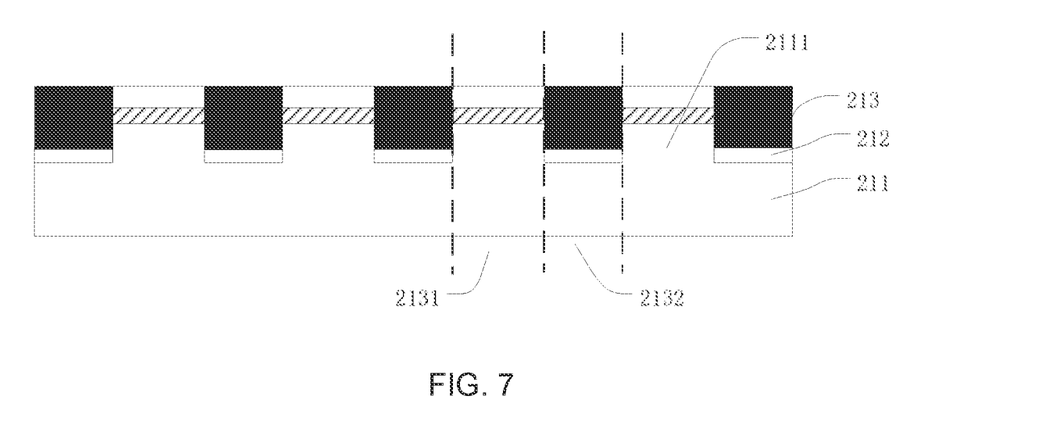
FIG. 7 is a structural schematic diagram of a polarizer in the preferred embodiment.

After the polarizer main body 213 is formed, a side surface thereof away from the substrate 211 is a smooth surface. Because the surface of the substrate 211 has an uneven shape, the polarizer main body 213 has different thicknesses. Specifically, a thickness of the polarizer main body 213 provided on the groove 2111 is greater than a thickness of the polarizer main body 213 provided on the protrusions. The groove 2111 corresponds to the non-light-transmitting region 2132. Because of isotropic absorption of visible light by the dichroic dye molecules 21301, the non-light-transmitting region 2132 has a non-light-transmitting property. The greater the thickness of the polarizer main body 213 at the groove 2111 is, the greater a number of dichroic dye molecules 21301 is, which makes the non-light-transmitting property of the non-light-transmitting region 2132 stronger.

In order to better explain the present application, this embodiment further provides a manufacturing method of the above-mentioned first polarizer, including the following steps.

S1) Providing the substrate. The substrate is a transparent glass substrate, and the substrate is etched with the groove.

S2) Forming the alignment layer on the side surface of the substrate and aligning the alignment layer. An alignment method includes any one of ultraviolet alignment, printing alignment, or imprint alignment. A plurality of rectangular and spaced alignment regions and non-alignment regions arranged around the alignment regions are formed on the alignment layer. The non-alignment region corresponds to the groove.

S3) Forming the polarizer main body on the side surface of the alignment layer away from the substrate. The polarizer main body is the composite layer including the dichroic dye and the liquid crystal mixture. The liquid crystals in the composite layer facing the alignment region are deflected under the alignment force of the alignment layer to transmit light. The light-transmitting region and the non-light-transmitting region are divided according to a presence or an absence of the alignment force of the alignment layer. The thickness of the polarizer main body in the light-transmitting region is less than the thickness of the polarizer main body in the non-light-transmitting region.

The array substrate 220 is disposed on the side surface of the first polarizer 210 away from the backlight module 100. A plurality of thin film transistor (TFT) units, common electrode voltage (VCOM) circuits, indium tin oxide (ITO), storage capacitors, etc. are provided on the array substrate 220, which are mainly responsible for charging and discharging each pixel.

The array substrate 220 includes the display region and the non-display region. The display region corresponds to the light-transmitting region 2131 (alignment region 2121) in the first polarizer 210. The non-display region of the array substrate 220 corresponds to the non-light-transmitting region 2132 (non-alignment region 2122) in the first polarizer 210.

Specifically, a plurality of scan lines (not shown) and a plurality of data lines (not shown) are disposed on the array substrate 220. The scan lines and the data lines intersect to define a plurality of pixel regions, and the pixel regions are disposed in the display region of the array substrate 220.

The liquid crystal layer 230 is disposed on a side surface of the array substrate 220 away from the first polarizer 210. The liquid crystal layer 230 is provided with a plurality of liquid crystal molecules LC. When upper and lower substrates of the liquid crystal layer 230 are driven by a voltage, the liquid crystal molecules LC undergo directional deflection under an action of an electric field.

Figure 9:
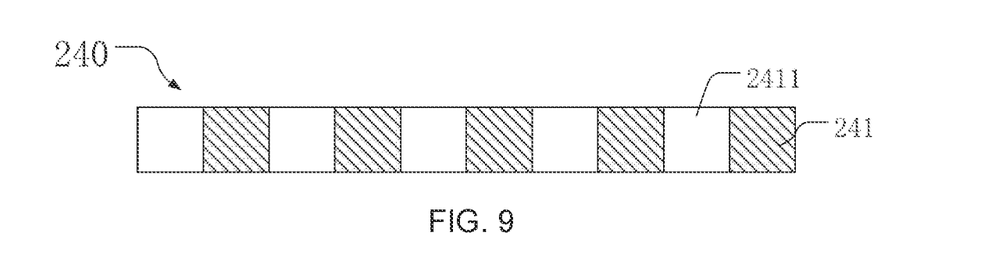
FIG. 9 is a structural schematic diagram of a color filter substrate in the first embodiment.

Please refer to FIG. 9. The color filter substrate 240 is disposed on a side surface of the liquid crystal layer 230 away from the array substrate 220. The color filter substrate 240 is provided with a plurality of color resist units 241. The color resist units 241 include a red color resist unit, a blue color resist unit, and a green color resist unit. The color resist units are distributed at intervals. Color display of a liquid crystal panel 200 can be realized by a combination of the red color resist unit, the blue color resist unit, and the green color resist unit. Specifically, the color resist units 241 are disposed in the display region, which means that the color resist units 241 correspond to the light-transmitting region 2131 (alignment region 2121). After light of the backlight module 100 passes through the first polarizer 210, all the light axially parallel to the light-transmitting axis of the first polarizer 210 can pass through the color resist units 241, thereby ensuring a display brightness of the liquid crystal panel 200.

In particular, in this embodiment, because the non-light-transmitting region 2132 of the first polarizer 210 can achieve a complete light shielding effect, and the non-light-transmitting region 2132 corresponds to the non-display regions of the array substrate 220 and the non-display region of the color filter substrate 240, there is no need to further provide a black matrix on the color filter substrate 240, and only the color resist units 241 need to be provided in the pixel regions, which save costs required for manufacturing the black matrix in the prior art. Meanwhile, a manufacturing accuracy of the color resist units 241 does not need to be too high. There can be a gap 2411 between two adjacent color resist units 241, and a width of the gap 2411 is less than a width of the non-light-transmitting region 2132.

Figure 10:
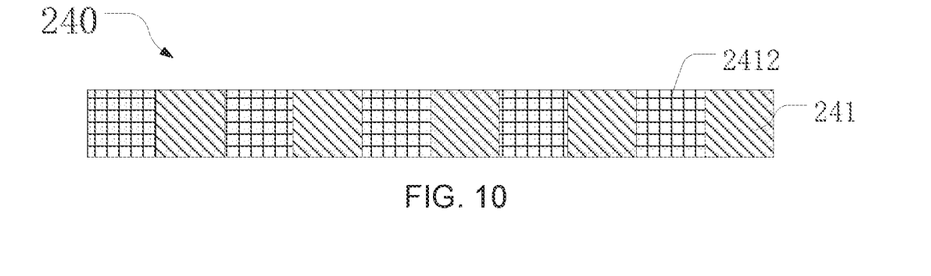
FIG. 10 is a structural schematic diagram of a color filter substrate in another preferred embodiment.

Please refer to FIG. 10, in another preferred embodiment of the present application, there can be an overlapping region 2412 between two adjacent color resist units 241, and a width of the overlapping region 2412 is less than a width of the non-light-transmitting region 2132.

The color filter substrate 240 and the array substrate 220 can simultaneously control a driving voltage, thereby forming an electric field above and below the liquid crystal layer 230 and controlling deflection of the liquid crystal molecules LC in the liquid crystal layer 230.

In the liquid crystal panel 200, upper and lower polarizers need to be disposed at a same time to realize a brightness adjustment of unit pixels. Therefore, in this embodiment, the second polarizer 250 is disposed on a side surface of the color filter substrate 240 away from the liquid crystal layer 230.

The first polarizer 210 and the second polarizer 250 are respectively disposed on two sides of the liquid crystal layer 230. The first polarizer 210 is configured to convert a uniform surface light source emitted by the backlight module 100 into polarized light, and the second polarizer is configured to analyze polarized light deflected by the liquid crystal layer 230, thereby generating a contrast between light and dark to realize image display of the liquid crystal panel 200.

The second polarizer 250 is a wire grid polarizer, and a light-transmitting axis of the second polarizer 250 is perpendicular to the transmission axis of the first polarizer 210. The second polarizer 250 includes polyvinyl alcohol (PVA) in a middle, two layers of triacetate cellulose (TAC), a pressure sensitive adhesive (PSA) film, a release film, and a protective film. The PVA plays a role of polarizing, but the PVA is prone to be hydrolyzed. In order to protect physical properties of a polarizing film, a layer of TAC film with high light transmittance, good water resistance, and certain mechanical strength is laminated on two sides of the PVA for protection. When laminating, the second polarizer 250 is attached to the side surface of the color filter substrate 240 away from the liquid crystal layer 230 through the PSA film.

Figure 11:
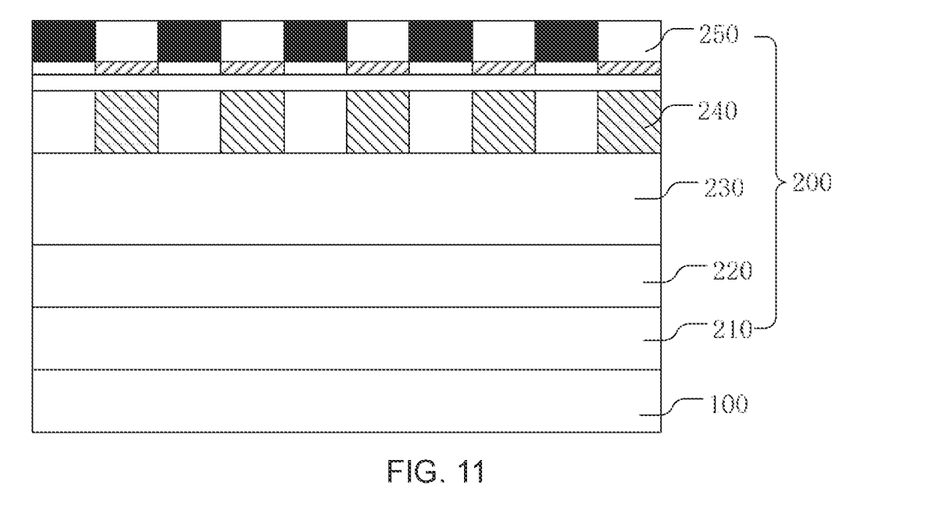
FIG. 11 is a structural schematic diagram of a display device in another preferred embodiment.

Please refer to FIG. 11. In another preferred embodiment of the present application, positions of the first polarizer 210 and the second polarizer 250 can be exchanged, and the technical effect remains.

Beneficial effects of this embodiment are as follows. The polarizer, the manufacturing method thereof, and the display device in this embodiment divide the polarizer in a direction of a light-emitting side of the backlight module into the light-transmitting region and the non-light-transmitting region. The light-transmitting region corresponds to a display region and can normally transmit light. The non-light-transmitting region corresponds to the non-display region and serves to shield light, which has a similar effect as an effect of the black matrix in a color filter and can even completely replace the black matrix. Therefore, the black matrix can be thinned or even eliminated, and normal display of the display panel can be ensured. Moreover, the polarizers are coated polarizers, which can be made by coating, thereby simplifying manufacturing processes and reducing costs.

Second Embodiment

Figure 12:
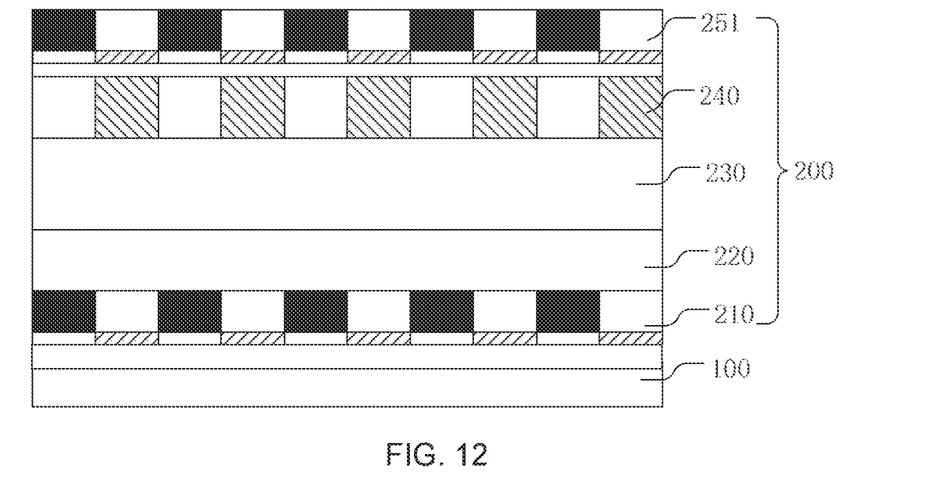
FIG. 12 is a structural schematic diagram of a display device in a second embodiment.

Please refer to FIG. 12. In this embodiment, a display device of the present application includes a backlight module 100 and a liquid crystal panel 200.

The edge-type backlight module can be provided with a backlight source light-emitting diode (LED) light bar on an edge of the backplate behind the liquid crystal panel. Light emitted by the LED light bar enters the light guide plate (LGP) from a light incident surface on a side of the light guide plate, is reflected and diffused, and then emitted from a light-emitting surface of the light guide plate, and passes through an optical film set to form a surface light source for the liquid crystal panel.

The liquid crystal panel 200 includes a first polarizer 210, an array substrate 220, a liquid crystal layer 230, a color filter substrate 240, and a second polarizer 250.

The first polarizer 210 is disposed on a light-emitting side of the backlight module 100. The light-emitting side of the backlight module 100 emits a stable surface light source. After the surface light source passes through the first polarizer 210, it is filtered by the first polarizer 210 into a plurality of parallel light beams. A direction of the parallel light beams is axially parallel to a light-transmitting axis of the first polarizer 210.

Specifically, the first polarizer 210 includes a substrate 211, an alignment layer 212, and a polarizer main body 213.

The substrate 211 is a fully transparent substrate. In this embodiment, the substrate 211 is a transparent glass substrate. The substrate 211 is configured to receive the alignment layer 212 and the polarizer body 213. The alignment layer 212 is disposed on a side surface of the substrate 211. The polarizer main body 213 is disposed on a side surface of the alignment layer 212 away from the substrate 211. The first polarizer 210 is provided with a first polarization direction, so that after liquid crystals are deflected with a same deflection direction as the first polarization direction, light can be emitted through the first polarizer 210.

In a preferred embodiment of the present application, the substrate 211 includes a plurality of grooves 2111

Material of the alignment layer 212 is polyimide (PI). An alignment process of a PI solution is as follows. A layer of the PI solution is printed on the substrate 211. The substrate 211 printed with the PI solution is placed on a carrier, wherein a side of the substrate 211 printed with the PI solution is away from the carrier. The substrate 211 printed with the PI solution forms a certain deflection angle with respect to a fixed light box. The light box emits ultraviolet (UV) light with a fixed wavelength, which irradiates the substrate 211 to cause the PI solution to react. The carrier and the substrate 211 printed with the PI solution pass through the light box in a straight-line direction to complete an optical alignment process.

In another preferred embodiment of the present application, the alignment layer 212 can also be aligned by embossing or printing.

In another preferred embodiment of the present application, it is also possible to divide an alignment region and a non-alignment region on the substrate 211 in advance, and only apply the PI solution or other alignment solutions on the alignment region. In this way, the PI solution only needs to be patterned in the alignment region to enable the alignment layer 212 in the alignment region to have an alignment force. Because the substrate 211 corresponding to the non-alignment region does not need the alignment force, the non-alignment region does not need to be coated with the PI solution, thereby saving the PI solution and preventing waste of resources.

In this embodiment, the alignment layer 212 includes an alignment region 2121 and a non-alignment region 2122. The alignment region 2121 is distributed in an array. The non-alignment region 2122 is disposed between two adjacent alignment regions 2121 and around the alignment region 2121. The alignment layer 212 has the alignment force at the alignment region 2121, and the alignment layer 212 does not have the alignment force at the non-alignment region 2122.

Because the alignment layer 212 has the alignment force at the alignment region 2121, and the alignment layer 212 does not have the alignment force at the non-alignment region 2122, the polarizer main body 213 can be divided into a light-transmitting region 2131 and a non-light-transmitting region 2132 according to a presence or an absence of the alignment force of the corresponding alignment layer 212. The light-transmitting region 2131 corresponds to the alignment region 2121 of the alignment layer 212, and the non-light-transmitting region 2132 corresponds to the non-alignment region 2122 of the alignment layer 212.

The light-transmitting region 2131 has a plurality of parallel light-transmitting axes, and the light-transmitting axes can allow light parallel to an axial direction of the light-transmitting axes to pass through, thereby realizing a polarization function of the polarizer.

Because the non-light-transmitting region 2132 does not have the alignment force, any light is not allowed to pass. Therefore, the non-light-transmitting region 2132 is a light-shielding region, which can block direct light from the non-light-transmitting region 2132 in any direction.

Specifically, the polarizer main body 213 is a composite layer including a dichroic dye and a liquid crystal mixture. The dichroic dye can have different light absorption along different axes. In this embodiment, in the light-transmitting region 2131, under an action of the alignment force of the alignment region 2121 of the alignment layer 212, liquid crystal molecules 21302 in the composite layer can make dispersed dichroic dye molecules 21301 parallel to their major axes, so that the liquid crystal molecules 21302 and the dichroic dye molecules 21301 are directionally distributed. In addition, a deflection direction of the liquid crystal molecules 21302 and the dichroic dye molecules 21301 is parallel to a light-transmitting axis of the light-transmitting region 2131, so that light corresponding to the light-transmitting region 2131 is allowed to pass through.

On the contrary, in the non-alignment region 2122 of the alignment layer 212, because there is no alignment force in the non-alignment region 2122, the dichroic dye molecules 21301 and the liquid crystal molecules 21302 in the composite layer in the non-light-transmitting region 2132 are in no need to be distributed. The dichroic dye molecules 21301 in the non-light-transmitting region 2132 absorb visible light isotropically, so that all light entering the non-light-transmitting region 2132 cannot pass through the non-light-transmitting region 2132, thereby achieving a technical effect of light shielding.

In this embodiment, the polarizer main body 213 is the composite layer, and light transmission and light shielding of the first polarizer 210 is achieved by deflection or non-deflection of the dichroic dye and the liquid crystal mixture in the composite layer.

In order to better explain the present application, this embodiment further provides a manufacturing method of the above-mentioned first polarizer, including the following steps.

S1) Providing the substrate. The substrate is a transparent glass substrate, and the substrate is etched with the groove.

S2) Forming the alignment layer on the side surface of the substrate and aligning the alignment layer. An alignment method includes any one of ultraviolet alignment, printing alignment, or imprint alignment. A plurality of rectangular and spaced alignment regions and non-alignment regions arranged around the alignment regions are formed on the alignment layer. The non-alignment region corresponds to the groove.

S3) Forming the polarizer main body on the side surface of the alignment layer away from the substrate. The polarizer main body is the composite layer including the dichroic dye and the liquid crystal mixture. The liquid crystals in the composite layer facing the alignment region are deflected under the alignment force of the alignment layer to transmit light. The light-transmitting region and the non-light-transmitting region are divided according to a presence or an absence of the alignment force of the alignment layer. The thickness of the polarizer main body in the light-transmitting region is less than the thickness of the polarizer main body in the non-light-transmitting region.

The array substrate 220 is disposed on the side surface of the first polarizer 210 away from the backlight module 100. A plurality of thin film oxide (ITO), storage capacitors, etc. are provided on the array substrate 220, which are mainly responsible for charging and discharging each pixel.

The array substrate 220 includes the display region and the non-display region. The display region corresponds to the light-transmitting region 2131 (alignment region 2121) in the first polarizer 210. The non-display region of the array substrate 220 corresponds to the non-light-transmitting region 2132 (non-alignment region 2122) in the first polarizer 210.

Specifically, a plurality of scan lines (not shown) and a plurality of data lines (not shown) are disposed on the array substrate 220. The scan lines and the data lines intersect to define a plurality of pixel regions, and the pixel regions are disposed in the display region of the array substrate 220.

The liquid crystal layer 230 is disposed on a side surface of the array substrate 220 away from the first polarizer 210. The liquid crystal layer 230 is provided with a plurality of liquid crystal molecules LC. When upper and lower substrates of the liquid crystal layer 230 are driven by a voltage, the liquid crystal molecules LC undergo directional deflection under an action of an electric field.

The color filter substrate 240 is disposed on a side surface of the liquid crystal layer 230 away from the array substrate 220. The color filter substrate 240 is provided with a plurality of color resist units 241. The color resist units 241 include a red color resist unit, a blue color resist unit, and a green color resist unit. The color resist units are distributed at intervals. Color display of a liquid crystal panel 200 can be realized by a combination of the red color resist unit, the blue color resist unit, and the green color resist unit. Specifically, the color resist units 241 are disposed in the display region, which means that the color resist units 241 correspond to the light-transmitting region 2131 (alignment region 2121). After light of the backlight module 100 passes through the first polarizer 210, all the light axially parallel to the light-transmitting axis of the first polarizer 210 can pass through the color resist units 241, thereby ensuring a display brightness of the liquid crystal panel 200.

In particular, in this embodiment, because the non-light-transmitting region 2132 of the first polarizer 210 can achieve a complete light shielding effect, and the non-light-transmitting region 2132 corresponds to the non-display regions of the array substrate 220 and the non-display region of the color filter substrate 240, there is no need to further provide a black matrix on the color filter substrate 240, and only the color resist units 241 need to be provided in the pixel regions, which save costs required for manufacturing the black matrix in the prior art. Meanwhile, a manufacturing accuracy of the color resist units 241 does not need to be too high. There can be a gap 2411 between two adjacent color resist units 241, and a width of the gap 2411 is less than a width of the non-light-transmitting region 2132.

In another preferred embodiment of the present application, there can be an overlapping region 2412 between two adjacent color resist units 241, and a width of the overlapping region 2412 is less than a width of the non-light-transmitting region 2132.

The color filter substrate 240 and the array substrate 220 can simultaneously control a driving voltage, thereby forming an electric field above and below the liquid crystal layer 230 and controlling deflection of the liquid crystal molecules LC in the liquid crystal layer 230.

In the liquid crystal panel 200, upper and lower polarizers need to be disposed at a same time to realize a brightness adjustment of unit pixels. Therefore, in this embodiment, a third polarizer 251 is disposed on a side surface of the color filter substrate 240 away from the liquid crystal layer 230.

The first polarizer 210 and the third polarizer 251 are respectively disposed on two sides of the liquid crystal layer 230. The first polarizer 210 is configured to convert a uniform surface light source emitted by the backlight module 100 into polarized light, and the third polarizer 251 is configured to analyze polarized light deflected by the liquid crystal layer 230, thereby generating a contrast between light and dark to realize image display of the liquid crystal panel 200.

In this embodiment, the third polarizer 251 has a same structure as the first polarizer 210. A difference is that a light-transmitting axis of the third polarizer 251 in this embodiment is perpendicular to the light-transmitting axis of the first polarizer 210.

Beneficial effects of this embodiment are as follows. The polarizer, the manufacturing method thereof, and the display device in this embodiment dispose the polarizers above and below the liquid crystal layer into a film with the light-transmitting region and the non-transmitting region. The non-light-transmitting region of the first polarizer corresponds to the non-light-transmitting region of the second polarizer, which enhances a light-shielding effect on the non-display region. Moreover, the polarizers are coated polarizers, which can be made by coating, thereby simplifying manufacturing processes and reducing costs.

The description of embodiments above is only for helping to understand technical solutions of the present application and its core idea. Understandably, for a person of ordinary skill in the art can make various modifications of the technical solutions of the embodiments of the present application above. However, it does not depart from the scope of the technical solutions of the embodiments of the present application.

What is claimed is:

1. A polarizer, comprising an alignment layer, a polarizer main body, and a substrate, wherein the alignment layer is disposed on a side surface of the substrate, and the polarizer main body is disposed on a side surface of the alignment layer away from the substrate;
    wherein the polarizer main body comprises:
        a plurality of light-transmitting regions distributed on the polarizer main body at intervals; and
        a non-light-transmitting region surrounding the light-transmitting regions;
    wherein the alignment layer comprises alignment regions corresponding to the light-transmitting regions;
    wherein the side surface of the substrate is defined with at least one groove, the groove surrounds and forms a plurality of protrusions, and the groove corresponds to the non-light-transmitting region; and a thickness of the polarizer main body corresponding to the protrusions is less than a thickness of the polarizer main body corresponding to the groove.

2. The polarizer according to claim 1, wherein the polarizer main body is a composite layer comprising a dichroic dye and a liquid crystal mixture.

3. The polarizer according to claim 1, wherein the alignment layer is only disposed on surfaces of the protrusions.

4. A display device, comprising:
    a backlight module comprising a light-emitting side;
    a first polarizer disposed on the light-emitting side of the backlight module;
    an array substrate disposed on a side surface of the first polarizer away from the backlight module;
    a liquid crystal layer disposed on a side surface of the array substrate away from the first polarizer;
    a color filter substrate disposed on a side surface of the liquid crystal layer away from the array substrate; and a second polarizer disposed on a side surface of the color filter substrate away from the liquid crystal layer;

wherein the first polarizer and/or the second polarizer is the polarizer according to claim 1.

5. The display device according to claim 4, wherein the color filter substrate comprises a plurality of color resist units, and each of the color resist units corresponds to one of the light-transmitting regions.

6. The display device according to claim 5, wherein a gap is provided between two adjacent color resist units, and the gap corresponds to the non-light-transmitting region; or an overlapping region is provided between two adjacent color resist units, and the overlapping region corresponds to the non-light-transmitting region.

7. A manufacturing method of a polarizer, comprising steps of:

providing a substrate;

forming an alignment layer on a side surface of the substrate and forming alignment regions distributed in an array on the alignment layer; and forming a polarizer main body on a side surface of the alignment layer away from the substrate, forming light-transmitting regions on the polarizer main body corresponding to the alignment regions, and forming a non-light-transmitting region on a rest of the polarizer main body;

wherein the side surface of the substrate is defined with at least one groove, the groove surrounds and forms a plurality of protrusions, and the groove corresponds to the non-light-transmitting region; and a thickness of the polarizer main body corresponding to the protrusions is less than a thickness of the polarizer main body corresponding to the groove.

8. The manufacturing method of the polarizer according to claim 7, wherein material of the polarizer main body comprises a dichroic dye and a liquid crystal mixture, and the polarizer main body is manufactured by coating.

* * * * *